United States Patent [19]
Ohno et al.

[11] Patent Number: 4,561,747
[45] Date of Patent: Dec. 31, 1985

[54] AUTO-FOCUSING METHOD

[75] Inventors: Yoshimi Ohno, Kawasaki; Ikuya Tsurukawa, Yokohama, both of Japan

[73] Assignee: Ricoh Company, Ltd., Tokyo, Japan

[21] Appl. No.: 620,707

[22] Filed: Jun. 14, 1984

[30] Foreign Application Priority Data

Jun. 30, 1983 [JP] Japan ............................... 58-118922

[51] Int. Cl.$^4$ ................................................. G03B 3/00
[52] U.S. Cl. ...................................... 354/402; 354/408
[58] Field of Search ................................. 354/402–408

[56] References Cited

U.S. PATENT DOCUMENTS 4,133,606 1/1979 Hosoe et al. ........................ 354/402
4,253,752 3/1981 Ichihara ............................... 354/402
4,333,007 6/1982 Langlais et al. ..................... 354/402

Primary Examiner—Russell E. Adams
Attorney, Agent, or Firm—Oblon, Fisher, Spivak, McClelland & Maier

[57] ABSTRACT

An auto-focusing method includes a scanning step for scanning a pair of solid-state image sensors on which light from a subject of interest impinges as passing through a focusing lens, an A/D conversion step, a Fourier transformation step, a convolution operation step, a peak detection step for determining an amount of displacement of said lens from the results of said convolution, and a lens displacement step for displacing said lens according to the displacement amount thus determined. The present auto-focusing method is least susceptible to noises and not adversely affected by differences in contrast of the subject of interest.

5 Claims, 2 Drawing Figures

AUTO-FOCUSING METHOD

BACKGROUND OF THE INVENTION

1. Field of the Invention

This invention relates to an auto-focusing method and particularly to a method to be applied to an auto-focus system of a photographic camera.

2. Description of the Prior Art

An auto-focusing method for carrying out an auto-focusing operation by leading the light reflected from a subject to be photographed to a pair of solid-state image sensors through a lens to be brought into in-focused position and displacing the lens in the direction of optical axis in accordance with a correlation between the outputs from the solid-state image sensors is well known in the art. A typical example includes Honeywell's TLC system.

In this type of the prior art auto-focusing method, it is assumed that the output from each of the pair of solid-state image sensors provide the same functional format so that it is highly susceptible to noises. Furthermore, if output characteristics of a plurality of photoelectric elements of each of the solid-state sensors are scattered, the outputs, which should inherently be of the same functional format, are distorted by such a scatter and differ one from another. For this reason, it is thus required to use a solid-state image sensor having no scatter in the output characteristics of its photoelectric elements for each of the paired solid-state image sensors. However, since the yield in manufacturing such a solid-state image sensor is low, it is difficult to lower the cost of such a solid-state image sensor, thereby pushing up the cost of auto-focusing system.

Moreover, in this type of prior art auto-focusing method, the correlation between the outputs from the paired solid-state image sensors is evaluated by the following evaluation function $$\overline{\phi}(i) = \sum_{n=\alpha}^{\beta} \{(A(n) - B(n + 1 + i))^k - (B(n) - A(n + 1 + i))^k\}$$

where A(n) and B(n) are outputs from the respective solid-state image sensors for $n = 1 - N$ with N indicating the number of photoelectric elements in each of the solid-state image sensors and $\alpha$, $\beta$ and k are set values. As is clear from the format of the evaluation function, it is affected by the contrast of a subject to be photographed. Thus, if the contrast is low, there are produced such disadvantages as deterioration in in-focusing accuracy and substantial time delay in realization of in-focused condition.

SUMMARY OF THE INVENTION

It is therefore a primary object of the present invention to obviate the disadvantages of the prior art as described above and to provide an improved auto-focusing method.

Another object of the present invention is to provide an improved auto-focusing method which is least susceptible to noises.

A further object of the present invention is to provide an improved auto-focusing method which is not adversely affected by the contrast of a subject to be focused.

A still further object of the present invention is to provide an auto-focus method and system which can be advantageously applied to an auto-focus mechanism of a photographic camera.

Other objects, advantages and novel features of the present invention will become apparent from the following detailed description of the invention when considered in conjunction with the accompanying drawings.

DESCRIPTION OF THE PREFERRED EMBODIMENTS

Figure 1:
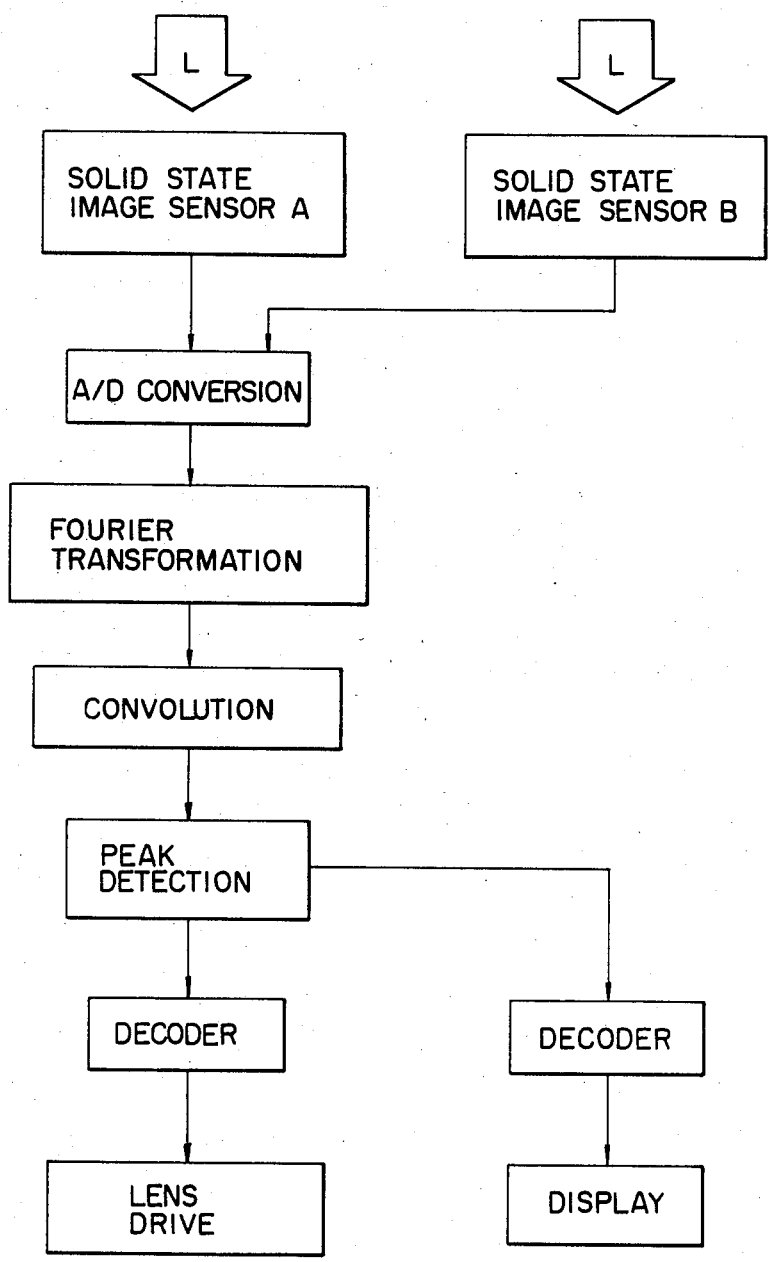
FIG. 1 is a block diagram showing the overall structure of an auto-focusing system constructed in accordance with one embodiment of the present invention.

The auto-focusing method of the present invention includes such steps as a scanning step for scanning each of a pair of solid-state image sensors, an analog-to-digital (A/D) conversion step, a Fourier transformation step, a convolution step, a peak detecting step for determining the amount of displacement of a lens from the results of convolution and a displacement step for displacing the lens to the in-focus position.

After passing through a lens which is to be brought into the in-focus position, the light impinges on a pair of solid-state image sensors. During the scanning step, this light is scanned by each of the paired solid-state image sensors so that there is produced an output in timed sequence in accordance with the intensity distribution of the light. This output is then supplied to the A/D conversion step where the analog output is converted into a digital quantity. The digital quantity thus obtained is then subjected to Fourier transformation at the Fourier transforming step and its results are then subjected to the convolution operation. Then, according to the results obtained from this convolution step, the amount of displacement for the lens to be brought into the in-focus position is determined at the peak detecting step. Finally, at the lens displacing step, the lens is moved to the in-focus position based on the amount of displacement thus determined.

Now, the fundamental principle of the present invention will be described below.

If two functions p(x) and q(x) are present, one method to evaluate the similarity between the two is to use the following equation.

$$\phi(\xi) = \int \{p(x) - q(x - \xi)\}^2 dx \quad (1)$$

In principle, the present invention uses this technique. If the above equation (1) is developed, we have $$\phi(\xi) = \int \{p(x)\}^2 dx + \int \{q(x-\xi)\}^2 dx - 2\int p(x)q(x-\xi)dx \quad (2).$$

This can be further modified in form as $$\phi(\xi) = [\int \{p(x)\}^2 dx + \int \{q(x-\xi)\}^2 dx]$$

$$\times \left[ 1 - \frac{2\int p(x)q(x - \xi)dx}{\int \{p(x)\}^2 dx + \int \{q(x - \xi)\}^2 dx} \right]. \quad (3)$$

Now, a consideration will be given to the factor in the second term of the above equation (3), which is $$1 - \frac{2\int p(x)q(x-\xi)dx}{\int \{p(x)\}^2 dx + \int \{q(x-\xi)\}^2 dx}. \quad (4)$$

The above equation (4) becomes 0 if $\xi=0$ and $p(x)=q(x)$. This is the condition in which two of the same function are superposed one on top of the other.

Let $p(x)$ and $q(x)$ to be functions obtained as outputs from a pair of solid-state image sensors. Since the light impinging on each of the pair of solid-state image sensors emanates from the same subject to be focused or photographed and passes through a lens which is to be brought into the in-focused position, $p(x)$ and $q(x)$ should be similar in format even with the presence of a scatter in the output characteristics of photoelectric elements in each of the sensors. In view of this, if the maximum value of the second term in the equation (4), which is $$\frac{2\int p(x)q(x-\xi)dx}{\int \{p(x)\}^2 dx + \int \{q(x-\xi)\}^2 dx}, \quad (5)$$

is closer to unity, the focusing lens should also be closer to the in-focus position, and, thus, depending on the value of which gives the maximum value of the equation (5), the amount of displacement of the lens should be able to be determined.

Moreover, as described previously, $p(x)$ and $q(x)$ are inherently similar functions from each other, and, thus, if $p(x)$ is a periodic function, then $q(x-)$ is also a periodic function having the same period. As a result, the numerator and the denominator in the above equation (5) have a common periodic factor. Thus, even if periodicity is present in $p(x)$ and $q(x-)$, the above equation (5) has nothing to do with periodicity.

Examination of the format of the numerator in the above equation (5) reveals that the Fourier transform of this numerator is a product of Fourier transforms of $p(x)$ and $q(-x)$ according to the well-known theorem of superposition. Accordingly, in calculating the above equation (5), it is convenient to subject $p(x)$ and $q(x)$ to Fourier transformation prior to the calculation, and then after carrying out the calculation to implement the inverse Fourier transformation.

Now, the present invention will be described more in detail by way of embodiments with reference to the drawings. FIG. 1 shows in blocks an auto-focusing system constructed in accordance with one embodiment of the present invention. As shown, light L coming from the same subject to be focused or photographed through a focusing lens (not shown) impinges on a pair of solid-state image sensors A and B. It is to be noted that each of the image sensors A and B includes N number of photoelectric elements as well known for one skilled in the art.

Now, scanning is carried out at each of the pair of solid-state image sensors A and B so that the intensity of light received by each of the photoelectric elements is converted into a series of output signals as $A(1), A(2), \ldots, A(n), \ldots, A(N)$ and $B(1), B(2), \ldots, B(n), \ldots, B(N)$. These output signals $A(n)$ and $B(n)$, where $n=1-N$, are then applied to an A/D converter to be converted into digital values $A'(n)$ and $B'(n)$, which are then supplied to a Fourier transformation unit to be subjected to the Fourier transformation operation. That is, $A'(n)$ and $B'(n)$ are Fourier-transformed as in the following manner.

$$F_1(u) = \sum_{n=1}^{N} 2 \times \frac{1}{N} \times A'(n) \times \cos\left(2\pi \times \frac{1}{N} \times u \times n\right)$$

$$F_2(u) = \sum_{n=1}^{N} 2 \times \frac{1}{N} \times A'(n) \times \sin\left(2\pi \times \frac{1}{N} \times u \times n\right)$$

$$G_1(u) = \sum_{n=1}^{N} 2 \times \frac{1}{N} \times B'(n) \times \cos\left(2\pi \times \frac{1}{N} \times u \times n\right)$$

$$G_2(u) = \sum_{n=1}^{N} 2 \times \frac{1}{N} \times B'(n) \times \sin\left(2\pi \times \frac{1}{N} \times u \times n\right)$$

where $u=0, 1, 2, \ldots, M$, and M is an integer which is equal to or smaller than $(N/2)-1$ and a set number appropriately determined from the spatial frequency component ratio of a subject to be photographed and the response speed in auto-focusing operation.

Outputs $F_1(u)$, $F_2(u)$, $G_1(u)$ and $G_2(u)$, where $u=0, 1, 2, \ldots, M$, from the Fourier transforming unit are then supplied to a convolution unit where a convolution execution is carried out using these values. That is, at the convolution unit, the following values are calculated from $F_1(u)$, $F_2(u)$, $G_1(u)$ and $G_2(u)$.

$$F_0 = \left[\sum_{u=1}^{M} \{F_1(u)\}^2 + \{F_2(u)\}^2\right]$$

$$G_0 = \left[\sum_{u=1}^{M} \{G_1(u)\}^2 + \{G_2(u)\}^2\right]$$

$$F(u) = (F_1(u) \times G_1(u) + F_2(u) \times G_2(u))$$

$$G(u) = (F_2(u) \times G_1(u) - F_1(u) \times G_2(u))$$

Then, using these values, the following equation is calculated.

$$f*g = \frac{2}{F_0 + G_0} \times \left(\sum_{u=1}^{M} F(u)\cos(ut) + G(u)\sin(ut)\right)$$

where, $f*g$ corresponds to the previously described equation (5).

The result $f*g$ is outputted in timed sequence at a predetermined pitch in variable t. That is, given that $t_i = \chi TI$, where $I = 1 - I_N$ and $i = 1 - I_N$, using clock T, constant $\chi$, and positive integer $I = 1, 2, 3, \ldots, I, \ldots$, In, where In is a set value, $f*g(t_i) = L(I)$ are outputted in timed sequence in the order of $I = 1, 2, \ldots$ and supplied to a peak detecting unit, where the peak detecting operation is carried out as in the following manner.

Figure 2:
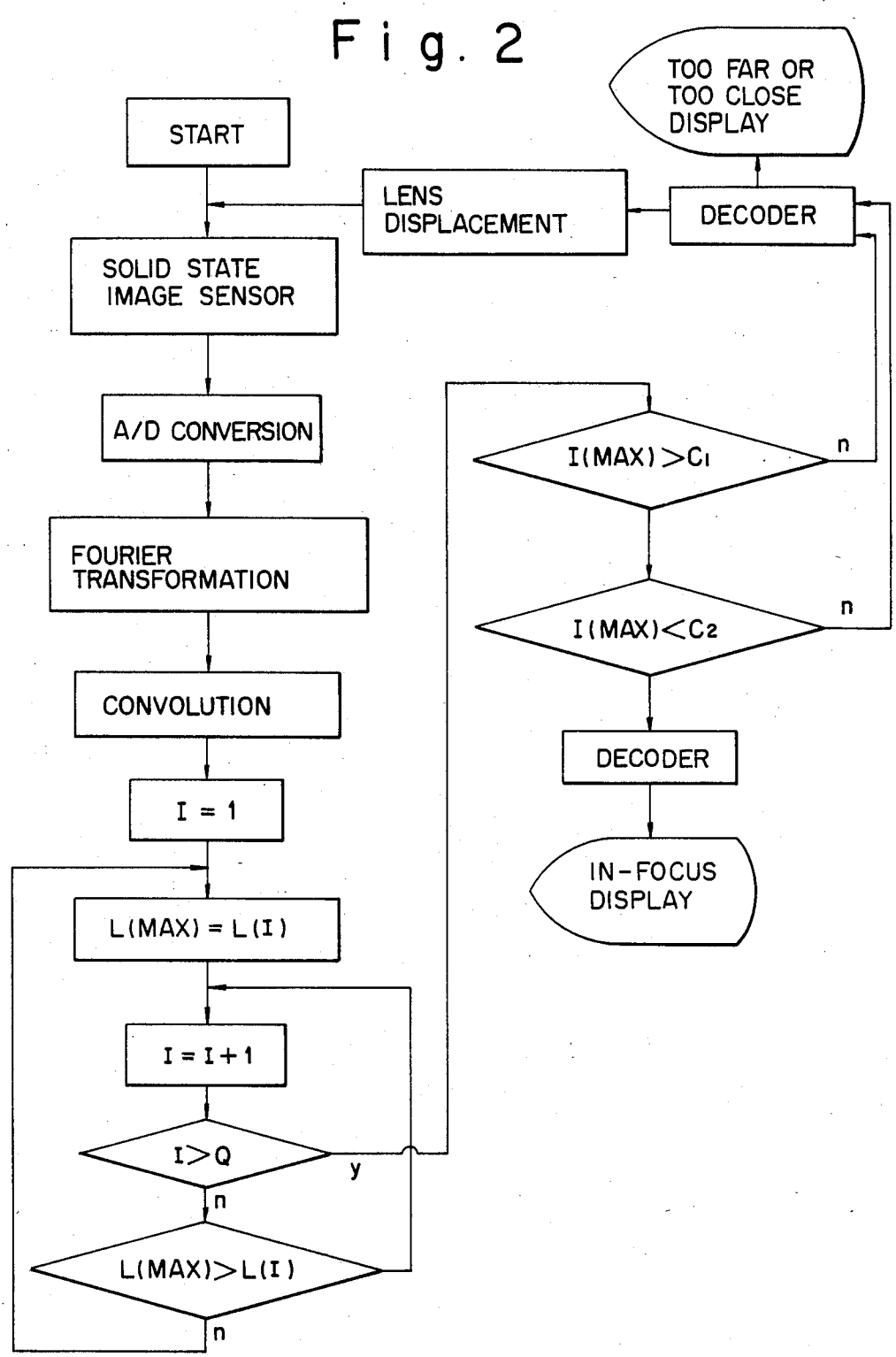
FIG. 2 is a flow chart showing a sequence of steps in the auto-focusing method of the present invention.

That is, as in the process shown in the flow chart of FIG. 2, the successively supplied $L(1), L(2), L(3), \ldots, L(I), \ldots, L(In)$ are successively compared one with respect to another, thereby detecting a maximum $L(MAX)$. And, the I which gives $L(MAX)$ is designated as $I(MAX)$, which is then compared with previously set values $C_1$ and $C_2$, whereby it is determined as to whether
  $I(MAX) > C_1$,
  $I(MAX) < C_2$, or
  $C_1 > I(MAX) > C_2$.

That is, the values of $C_1$ and $C_2$ are set such that if I(MAX) is larger than $C_1$, it indicates the too close condition; on the other hand, if I(MAX) is smaller than $C_2$, it indicates the too far condition. Thus, if I(MAX) is larger than $C_1$ or I(MAX) is smaller than $C_2$, then it is necessary to displace the lens so as to attain the in-focus condition. And the amount of movement of the lens is determined according to I(MAX), which is then supplied to a pair of decoders, one of which is connected to a lens drive to move the lens to the in-focus position and the other of which is connected to a display where the out-of-focus condition, too close or too far, is displayed appropriately. Then, the above process is again carried out right from the beginning of scanning step. On the other hand, if $C_1 <$ I(MAX) $< C_2$, the in-focus condition is attained so that there is no need to move the lens. In this case, the in-focus condition is indicated.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method of carrying out auto-focusing by displacing a lens along the direction of an optical axis of said lens in accordance with a correlation between outputs from a pair of solid-state image sensors, said method comprising the steps of:

passing light through said lens and impinging the light passed through said lens on both of said solid-state image sensors;

scanning each of said pair of solid-state image sensors thereby producing respective outputs A(n) and B(n);

converting said outputs A(n) and B(n) into digital data A'(n) and B'(n);

calculating Fourier transforms $F_1(u)$, $F_2(u)$, $G_1(u)$ and $G_2(u)$ using the following equations, $$F_1(u) = \sum_{n=1}^{N} 2 \times \frac{1}{N} \times A'(n) \times \cos\left(2\pi \times \frac{1}{N} \times u \times N\right)$$

$$F_2(u) = \sum_{n=1}^{N} 2 \times \frac{1}{N} \times A'(n) \times \sin\left(2\pi \times \frac{1}{N} \times u \times n\right)$$

$$G_1(u) = \sum_{n=1}^{N} 2 \times \frac{1}{N} \times B'(n) \times \cos\left(2\pi \times \frac{1}{N} \times u \times n\right)$$

$$G_2(u) = \sum_{n=1}^{N} 2 \times \frac{1}{N} \times B'(n) \times \sin\left(2\pi \times \frac{1}{N} \times u \times n\right)$$

where N is the number of photoelectric elements in each of said pair of solid-state image sensors, $u = 0, 1, 2, \ldots, M$, and M is an integer which is equal to or smaller than $(N/2) - 1$;

calculating the following values $F_0$, $G_0$, F(u) and G(u) from said $F_1(u)$, $F_2(u)$, $G_1(u)$ and $G_2(u)$, $$F_0 = \sum_{u=1}^{M} [\{F_1(u)\}^2 + \{F_2(u)\}^2]$$

$$G_0 = \sum_{u=1}^{M} [\{G_1(u)\}^2 + \{G_2(u)\}^2]$$

$$F(u) = (F_1(u) \times G_1(u) + F_2(u) \times G_2(u))$$

$$G(u) = (F_2(u) \times G_1(u) - F_1(u) \times G_2(u));$$

calculating the following value f*g, using said $F_0$, $G_0$, F(u) and G(u), in a timed sequence at a predetermined time period for variable t, $$f^*g = \frac{2}{F_0 + G_0} \times \left(\sum_{u=1}^{M} F(u)\cos(ut) + G(u)\sin(ut)\right) ; \text{ and}$$

determining an amount of displacement of said lens in accordance with a value of said variable t which gives a maximum value for said f*g, whereby if said amount of displacement thus determined is outside of a predetermined range, said lens is displaced to an in-focus position according to said amount of displacement thus determined.

2. The method of claim 1 wherein said timed sequence in calculating said f*g is determined by $$t_i = \chi T I$$

where $\chi$: constant,
T: clock period,
I: positive integer $1 - I_N$,
i: positive integer $1 - I_N$,
$I_N$: set value whereby, $f^*g(t_i) = L(I)$ is calculated sequentially for $I = 1, 2, \ldots$.

3. The method of claim 2 wherein said value of variable t giving a maximum value for f*g is determined by comparing said L(I) each other and designated as I(MAX) which is then compared with a pair of predetermined values $C_1$ and $C_2$ thereby indicating a too close condition if I(MAX) is larger than $C_1$, a too far condition if I(MAX) is smaller than $C_2$ and an in-focus condition if I(MAX) is larger than $C_1$ but smaller than $C_2$.

4. The method of claim 3 wherein the lens is moved only when said I(MAX) is either larger than $C_1$ or smaller than $C_2$ and said amount of displacement of said lens is determined according to said I(MAX).

5. The method of claim 4 further comprising the step of displaying a focusing condition determined by said step of comparing I(MAX) with $C_1$ and $C_2$.

* * * * *